Oct. 4, 1966

H. BERNSTEIN 3,277,391

DELAY LINE OR INDUCTOR VARIABLE BY EXPANSION OR CONTRACTION OF SPRING SITUATED IN FLUX FIELD THEREOF

Filed Jan. 7, 1964

INVENTOR.
HOWARD BERNSTEIN

BY

OSTROLENK, FABER, GERB & SOFFEN
ATTORNEYS

United States Patent Office 3,277,391

Patented Oct. 4, 1966

3,277,391

DELAY LINE OR INDUCTOR VARIABLE BY EXPANSION OR CONTRACTION OF SPRING SITUATED IN FLUX FIELD THEREOF

Howard Bernstein, New York, N.Y., assignor to Bel Fuse Inc., Jersey City, N.J., a corporation of New Jersey Filed Jan. 7, 1964, Ser. No. 336,273

13 Claims. (Cl. 333—31)

My invention relates to an electrical delay line and more particularly to a distributed constant artificial delay line having a novel means for varying the magnitude of circuit delay without necessitating the electrical disconnection of delay line segments.

In many electrical circuits it is necessary to introduce a time delay in the transmission paths of electrical signals. Accordingly various time delay networks are presently available to provide a discrete amount of delay within a practically realizable length. These time delay networks are usually of the distributed constant variety and would typically include an insulative support structure about which are contained a conductive ground plane and a distributed winding. The capacitive coupling between the windings and the ground plane in conjunction with the inductance of the windings establishes a distributed constant impedance to provide the desired signal delay along the length of the support structure. The required magnitude of delay may be obtained by appropriately selecting the physical characteristics of the support structure windings, ground plane and, if needed, additional bridge capacitive patches in a manner well known in the art.

It is frequently desirable to provide for a variation of the circuit delay introduced by the overall length of the delay line so as to permit an adjustment thereof. Previously this has been obtained as for example by the provision of a number of tap-off points along the winding length, so as to permit a tap-off of a segment of the total delay afforded thereby. Alternatively, a wiper arm may be longitudinally translated along the winding in accordance with the segment of the overall delay line length which is to be disconnected from the circuit. These arrangements in addition to requiring the cumbersome rearrangement of the portions of the delay line to be circuit connected, have also been found to produce signal degradation caused by the reflections from the unused section of the line. That is, the portion of the delay line external to the portion desired to be tapped into the circuit will still be electrically connected to the circuit and provide a source of signal reflections.

A somewhat improved arrangement for minimizing this source of signal reflection is shown in my copending U.S. patent application Serial No. 178,992, filed March 12, 1962, and entitled Tapped Delay Line, wherein the delay line windings are formed of individual discrete sections such that the unused sections of the overall delay line will be electrically isolated from the used sections. This arrangement, however, still disadvantageously requires a rearrangement of the external circuit connections to obtain a tap-off of those discrete segments required, as well as the inclusion of a wiping contact for fine adjustment thereof.

My invention is based on the novel concept that instead of tapping off a segment of the overall length of the delay line, the electrical characteristics of delay line itself are varied such that a circuit delay afforded by the complete length thereof will undergo the desired variation. Basically the delay line of this invention is constructed to include a longitudinal adjustment means in flux field coupling relationship with respect to inductive windings. This adjustment means is preferably in non-contact relationship with respect to the winding but in close proximity thereof such that the selective repositioning of the adjustment means with respect to the windings will vary the magnitude of its impedance, and accordingly the circuit delay afforded thereby.

As is well known, the inductance of the delay line windings is dependent upon the delay line core structure, with the inductance value generally being given with respect to an air core. However, should the core be formed other than of air, the per unit inductance provided by the windings, will be varied. As for example, should the longitudinal adjustment means be formed of brass, or other non-ferrous material, it will effect a reduction in the inductance of the windings as compared to the utilization of an air core. Conversely, the utilization of a magnetic material will provide an increase in inductance as compared to the case of an air core.

One form which my invention may take contemplates the use of a longitudinal spring type member located within the internal cavity of the conventional type of the support structure, and in registry with respect to the windings thereof.

The spring member is fixed at one end with respect to the support structure and movable at the other end by the provision of an external positioning means. The positioning means may take the form of a screw member threadily engaging the other end of the spring member such that rotation of the screw will effect expansion of longitudinal spring member so as to vary the amount of material thereof in proximity to the delay line windings.

Considering the use of a non-ferrous spring member, the decrease in inductance provided thereby will naturally be dependent upon the amount of spring material in flux-field proximity to the windings themselves. Hence, with the spring being in its compressed condition a maximum amount of material will be in registry with the windings and thereby effect a minimum inductance condition. Expansion of the spring member will reduce the amount of material in registry with the delay line windings, thereby providing a somewhat greater inductance than in the compressed condition, but still less than that provided by the use of an air core.

Another form which my invention contemplates utilizes a continuous rod or tube of inductance varying material similarly positioned within the support structure. For example, this rod may likewise be formed of brass and be movable relative to the length defined by the delay line windings. Should it be desired to provide a decrease in delay an externally accessible screw member will be turned in a direction to introduce a greater length of the brass rod into registry with the delay line windings. The support structure of this arrangement may be made twice the length occupied by the delay line winding such that the inductance varying rod may be completely withdrawn from its registry relationship with respect to the delay line windings. Accordingly, this arrangement will provide any intermediate delay from that defined by an air core to that defined by the complete length of the delay line windings having a core formed by the adjusting rod.

Hence it is seen that the basic concept of my invention resides in the provision of an adjustment means selectively positionable with respect to a conventional type of delay line structure so as to produce a variation in the delay afforded thereby without necessitating a modification of the circuit connections or the utilization of a wiper arm. This is particularly advantageous wherein the actual circuit delay required must be empirically determined after circuit fabrication and may therefore be provided by a simple screw driver adjustment during initial fabrication or in later field service.

It is accordingly a primary object of my invention to provide an improved variable delay line.

Another object of my invention is to provide a distributed constant delay line including an adjustment means for varying the magnitude of the circuit delay afforded thereby without necessitating a modification of circuit connections.

A further object of the present invention is to provide a variable electrical delay line which includes an inductance varying member selectively positionable in non-contact adjacent relationship with respect to the delay line windings.

Still another object of this invention is to provide an electrical delay line wherein an expansible spring member extends along the length of the delay line in registry with the winding thereof.

Still a further object of my invention is to provide such an electrical delay line wherein the spring member is formed of brass.

Yet another object of my invention is to provide an electrical delay line wherein a variation of the delay thereof is effected by the provision of an externally located screw adjustment, without necessitating disconnection of delay line segments from its associated circuiting.

These as well as other objects of my invention will readily become apparent from the following description and drawing in which.

Figures 1, 2, 3, 4, 5, 6:
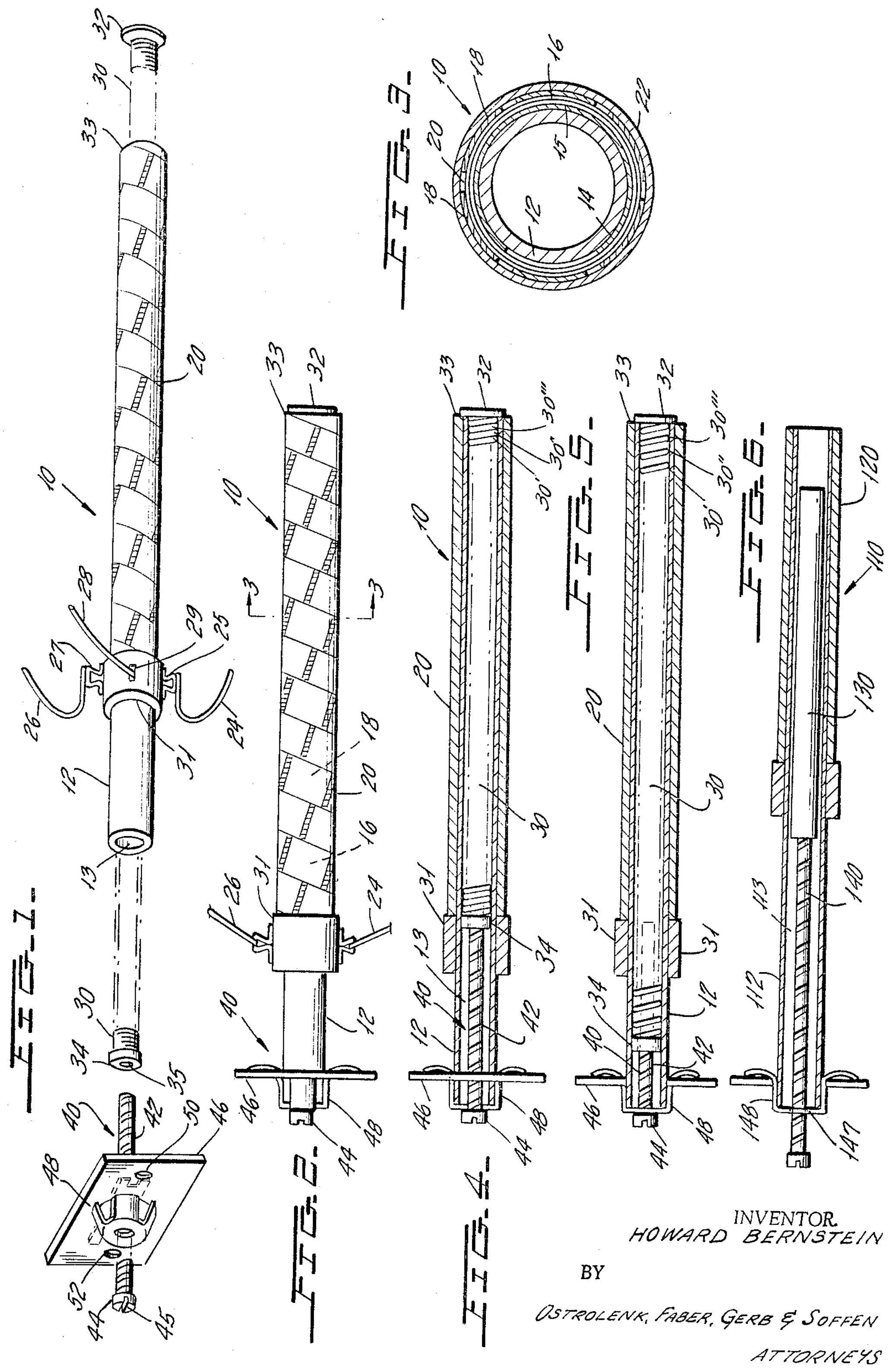
FIGURE 1 is an exploded perspective view of one form of my invention showing the expansible spring member internally located within the delay line support structure.
FIGURE 2 is a longitudinal view showing the delay line of FIGURE 1 in its assembled condition.
FIGURE 3 is a cross-sectional view along line 3—3 of FIGURE 2 and looking in the direction of the arrows, showing the typical construction of the delay producing network, as well as the physical location of the inductance varying spring member.
FIGURE 4 is a longitudinal cross-sectional view of the delay line as shown in FIGURE 2 with the inductance varying spring member in its fully compressed condition.
FIGURE 5 is a cross-sectional view corresponding to FIGURE 4, but showing the inductance varying spring member at an intermediate expanded condition.
FIGURE 6 is a cross-sectional view showing another form of my invention, wherein an inductance varying rod member is longitudinally translatable with respect to the delay line windings.

Referring initially to FIGURES 1 and 3, delay line 10 is formed about a hollowed cylindrical support structure 12, constructed of an insulating material such as glass, paper tubing or a ceramic. If not entirely formed of such an insulating material, at least the exterior surface thereof will be so formed, with the entire support structure 12 having a dielectric constant as close to unity as possible. A conductive layer 14 is placed on support structure 12 and is electrically connected to ground potential so as to form a ground plane. Ground plane 14 may comprise copper foil, aluminum foil or silver paint and may be formed of a single conductive element subtending a substantial portion of the circumference along the entire length of support structure 12 (as shown in these figures), or may be formed of a number of individual conductive elements, as is well known in the art. The windings 16, which may be either single or multiple-layer wound, are then placed in close proximity to ground plane 14. Although the winding 16 will generally be formed of insulated wire it is preferable to include an insulating layer 15 of Mylar polyester or other appropriate insulating material so as to prevent against electrical shorting between the windings 16 and ground plane 14. Should it be desirable to provide for an additional amount of capacitance, in excess to that obtained between the capacitive couplings of coil windings 16 and ground plane 14, conductive bridge patches 18 isolated from ground potential may be provided. The additional bridge capacity may for example be obtained by silver painting conductive patches 18 on a Mylar polyester ribbon 20 and winding same about the windings 16. The entire delay line 10 is then preferably encased in wax 22 or other appropriate moisture barrier.

Electrical connection to the external circuit (not shown) is provided by leads 24, 26 and 28 extending from fixed terminals 25, 27 and 29 secured to annular collar 31. Lead 24 may be electrically connected to one end of winding 16 (e.g., that closest to terminal collar member 31). Leads 26 may be connected to the opposite end of winding 16 (e.g., that located at the extreme right of the delay line structure as shown in FIGURE 1). Lead 28 will then be electrically connected to the conductive layer 14, which in turn is connected to circuit ground.

Up to this point, the description of the delay line 10 is in accordance with well known prior art techniques with there being naturally many other configurations possible. As for example, coil form 12 may be rectangular elliptical or have any other cross-section to obtain the required electrical and physical characteristics, the bridge capacity elements 18 may be of numerous other forms or eliminated completely. Hence it is to be understood that the novel aspects of my invention to be described in detail below may be utilized in conjunction with numerous other delay lines structures, with that shown in the figures and discussed above being merely for exemplary purposes.

To obtain an adjustment of delay I preferably include a longitudinal spring 30. Spring 30 may for example be formed of a magnetic material to effect an increase in inductance corresponding to its proximity with respect to windings 16, or of a non-ferrous material to effect a decrease in inductance corresponding to its proximity with respect to the delay line windings. I have, however, found that brass gives especially favorable results and in particular is linear with the frequency of signal applied to the circuit.

Spring 30 has an increased diameter stop 32 secured to one end thereof, as by welding or soldering, which serves as a back support to fixedly maintain the right hand end of the spring 30 at end 33 of support structure 12. The opposite end of spring member 30 is constructed to readily receive an externally accessible positioning member 40 as for example by the securing thereto of insert member 34 which includes protrusion 35 to mate with thread 42 of screw positioning member 40. Alternatively either or both backup stop member 32 and threaded insert member 34 may be eliminated by expanding the end turn of spring 30 at its right side to form an integral stop with end 33 of the delay line support structure 12, and reducing the spring diameter at its left hand end to threadily engage screw positioning member 40.

Head 44 of screw member 40 includes a slot 45 for the reception of a conventional type of screw driver blade (not shown). As will be subsequently discussed in conjunction with FIGURES 4 and 5, the rotation of the screw positioning member 40, in for example the clockwise direction will lineally translate insert member 34 to the left, thereby expanding spring 30. The size of thread 42 cut into screw 40 would be determined by the diameter of spring member 30 with the pitch thereof dependent upon the number of turns of screw 40 desired to traverse a given delay variation between terminals 24 and 26 of the overall delay line 10.

Screw 40 is maintained in position by its abutting relationship with lock fastener 48 (which may be of a standard commercially available Tinnerman variety). Lock fastener 48 is in turn secured to mounting plate 46 which may, for example include holes 50, 52 for mounting the delay line 10 to an appropriate chassis support bracket (not shown). Alternatively 46 may be an upturned portion of the chassis provided to receive the delay line 10.

Reference is now made to FIGURES 4 and 5 to illustrate the manner in which a delay variation is provided by my invention. As shown in FIGURE 4 the thread 42 of screw member 40 just engages mating insert member 34 of spring 30 such that the spring is in its fully compressed condition. That is, the adjacent turns thereof such, as 30′, 30″, and 30‴ will be in abutting relationship. The outer circumference of the spring is preferably in non-contact relationship with respect to the internal cavity 13 of the delay line support structure 12, but in sufficient proximity with respect to the inductive windings 16 so as to effect its flux field and thereby modify the inductance of windings. Should spring 30 be formed of brass, or other non-ferrous metal, it will effect a reduction in inductance, and hence delay, compared to the condition wherein spring member 30 were to be completely removed and an air core be provided for delay line 10.

The turning of screw member 40 in a direction to provide further engagement between the threads 42 thereof and mating spring end member 34 (as for example, clockwise), will provide expansion of spring member 30 as shown in FIGURE 5 such that the adjacent turns thereof, such as 30′, 30″ and 30‴ will now be in a space separated relationship, as is shown in FIGURE 5. In this condition there will naturally be less material of elongated spring 30 in registery relationship with respect to the windings 16 of delay line and accordingly there will be a lesser reduction of inductance as compared to the condition shown in FIGURE 4. Accordingly, by merely turning positioning screw 40, spring 30 will be gradually expanded or contracted to provide a variation in inductance, and hence delay in a much more simplified and convenient manner than has heretofore been possible. For example I have found that by utilizing a brass spring approximately 0.250 inch in diameter, 4½ inches long and having 22 turns-per-inch in conjunction with a commercially available delay line structure it is possible to obtain a delay variation of approximately between 0.65 microsecond and 0.45 microsecond, corresponding to only one quarter inch of travel of screw member 40. Further the delay has exhibited a linear variation with frequency at a band centered about 6 megacycles. It should be naturally understood that these parameters are given merely for exemplary purposes and in no way are intended to be construed as limiting the applicability of my invention.

The utilization of expansible member 30 for effecting the requisite delay variation preferably maintains tension on screw 40, thereby minimizing back lash and serving to maintain a given setting. Further since the inductance change occurs with a minimum of linear travel of screw 40 only a minimum increase of the overall length of delay line 10 is required.

Reference is now made to FIGURE 6 which shows another form which the delay line, now designated as 110, may take in accordance with the broad objectives of my invention. The form of electrical delay network may be of a construction corresponding to layers 14, 15, 16, 18, 20 and 22 discussed above and accordingly it is not believed that a further description thereof is necessary at this time, inasmuch as the essential difference between this embodiment and the previously discussed embodiment is only in the manner in which the variation in the delay is physically provided. In this regard the elongated conductance varying member is in the form of a rod or tube 130. As in the case of spring 30, it may be formed either of a magnetic material to effect an increase in inductance corresponding to its increased registry relationship with respect to the delay line windings or of non-ferrous material to effect a decrease in inductance corresponding to the increased registry relationship. Inductance varying rod 130 is secured at one of its ends to screw member 140 which is in threaded engagement with opening 147 of lock fastener 148. Hence the rotation of screw member 140 longitudinally translates inductance varying member 130 with respect to the delay line windings. It should naturally be understood that as a greater portion of member 130 is in registry with respect to the length of the delay line 110 it will have an increased detuning effect upon the delay line network and accordingly provide a further delay variation.

My invention therefore makes it possible to utilize conventional type of delay line network and effect a variation in the overall delay thereof by the selective positioning of an inductance varying member in a non-contact adjacent relationship with respect ot the windings thereof. The inductance varying member may be in a form of a spring or of a tubular member located either internally of the delay line structure or external thereof. Further rather than linearly translating the inductance varying member along the length of the delay line it may be of a variable diameter such that the adjustment of its location in proximity to the delay line network will effect the requisite delay variation.

In the foregoing this invention has been described in conjunction with preferred illustrative embodiments. Since many variations in modifications will now be obvious to those skilled in the art I prefer to be bound not to the specific disclosure herein contained but only by the appending claims.

The embodiments of the invention in which an exclusive privilege or property is claimed are defined as follows.

I claim:

1. An electrical delay line comprising a longitudinally extending support structure of insulating material; a plurality of windings about said support structure, and extending along the length thereof; a conductive surface about said support structure, and extending along the length thereof, in capacitive coupling relationship with respect to said windings; the inductance of said windings and their capacitive coupling to said conductive surface forming a distributed constant impedance along the length of said support structure; adjustment means for varying the magnitude of said impedance; said adjustment means including an inductance varying member selectively positionable in noncontact adjacent relationship with respect to said windings; said inductance varying member being an elongated spring; said adjustment means including means for varying the location of the individual coils of said spring relative to the location of said windings.

2. An electrical delay line comprising a longitudinally extending support structure of insulating material; a plurality of windings externally about said support structure, and extending along the length thereof; a conductive surface about said support structure, and extending along the length thereof, in capactive coupling relationship with respect to said windings; the inductance of said windings and their capacitive coupling to said conductive surface forming a distributed constant impedance along the length of said support structure; adjustment means for varying the magnitude of said impedance; said adjustment means including an inductance varying member selectively positionable in non-contact adjacent relationship with respect to said windings; said support structure having a longitudinally extending internal cavity; said inductance varying member being an elongated spring and extending into said internal cavity; said adjustment means including positioning means for varying the internal location of the individual coils of said spring relative to the external location of said windings about said support structure.

3. An electrical delay line comprising a longitudinally extending support structure of insulating material; a plurality of windings externally about said support structure, and extending along the length thereof; a conductive surface about said support structure, and extending along the length thereof, in capacitive coupling relationship with respect to said windings; the inductance of said windings and their capacitive coupling to said conductive surface forming a distributed constant impedance along the length of said support structure; adjustment means for varying the magnitude of said impedance; said adjustment means including an inductance varying member selectively positionable in non-contact adjacent relationship with respect to said windings; said support structure having a longitudinally extending internal cavity; said inductance varying member being an elongated spring and extending into said internal cavity; said adjustment means including positioning means for moving the individual coils of said spring along the length of said internal cavity for varying the portion of the spring coils in registry with said windings.

4. An electrical delay line comprising a longitudinally extending support structure of insulating material; a plurality of windings externally about said support structure, and extending along the length thereof; a conductive surface about said support structure, and extending along the length thereof, in capacitive coupling relationship with respect to said windings; the inductance of said windings and their capacitive coupling to said conductive surface forming a distributed constant impedance along the length of said support structure; adjustment means for varying the magnitude of said impedance; said adjustment means including an elongated spring member selectively positionable in non-contact adjacent relationship with respect to said windings; said spring member being formed of a material effecting the flux field coupling about said windings, whereby the amount of said material located in proximity with said windings effects the inductance thereof.

5. An electrical delay line as set forth in claim 4, wherein said material being brass.

6. An electrical delay line as set forth in claim 4, wherein said material being magnetic.

7. An electrical delay line comprising a longitudinally extending support structure of insulating material; a plurality of windings about said support structure, and extending along the length thereof; a conductive surface about said support structure, and extending along the length thereof, in capacitive coupling relationship with respect to said windings; the inductance of said windings and their capacitive coupling to said conductive surface forming a distributed constant impedance along the length of said support structure; adjustment means for varying the magnitude of said impedance; said adjustment means including an inductance varying member selectively positionable in non-contact adjacent relationship with respect to said windings; said inductance varying member being a spring, formed of a material effecting the flux field coupling about said windings, whereby the amount of said material located in registry with said windings effects the inductance thereof; positioning means adjustably expanding and compressing said spring along the length thereof located in registry with said windings; said spring when in said expanded condition presenting a minimum amount of said material in registry with said windings to effect a first inductance condition, and when in said compressed condition presenting a maximum amount of material in registry with said windings to effect a second inductance condition; said positioning means selectively positioning said spring between said first and second inductance conditions.

8. An electrical delay line comprising a longitudinally extending support structure of insulating material; a plurality of windings externally about said support structure, and extending along the length thereof; a conductive surface about said support structure, and extending along the length thereof, in capacitive coupling relationship with respect to said windings; the inductance of said windings and their capacitive coupling to said conductive surface forming a distributed constant impedance along the length of said support structure; adjustment means for varying the magnitude of said impedance; said adjustment means including an inductance varying member selectively positionable in non-contact adjacent relationship with respect to said windings; said support structure having a longitudinally extending internal cavity; said inductance varying member being of an elongated form and extending into said internal cavity; said adjustment means including positioning means for moving said elongated inductance varying member along the length of said internal cavity for varying the portion of the overall length of said inductance varying member being formed of a material effecting the flux field coupling about said windings, whereby the amount of said material located in proximity with said windings effects the inductance thereof; said inductance varying member being a spring, formed of a material effecting the flux field coupling about said windings, whereby the amount of said material located in registry with said windings effects the inductance thereof; said positioning means adjustably expanding and compressing said spring about the length thereof located in registry with said windings; said spring when in said expanded condition presenting a minimum amount of said material in registry with said windings to effect a first inductance condition, and when in said compressed condition presenting a maximum amount of material in registry with said windings to effect a second inductance condition; said positioning means selectively positioning said spring between said first and second inductance conditions.

9. An electrical delay line as set forth in claim 8, wherein said spring material being brass, said first inductance condition corresponding to maximum inductance, and said second inductance condition corresponding to minimum inductance.

10. A variable inductance element comprising a longitudinally extending, hollow support structure, formed of insulating material; a plurality of windings externally about said support structure, and extending along the length thereof; an elongated spring member mounted internally of said support structure, and extending along the length thereof, at least a portion of which is in registry with said windings; said spring being formed of a material effecting the flux field coupling.

11. A variable inductance element as set forth in claim 10, wherein said spring material being brass, and adjustment means for varying the registry relationship between said spring and said windings so as to provide a first inductance condition corresponding to first valve, and a second inductance condition corresponding to a lesser inductance valve.

12. A variable inductance element comprising a longitudinally extending, hollow support structure, formed of insulating material; a plurality of windings externally about said support structure, and extending along the length thereof; a ground plane conductive surface about said support structure and adjacent said windings in capacitive coupling relationship therewith; the inductance of said windings and their capacitive coupling relationship to said ground plane forming a distributed constant impedance along the length of said support structure; an elongated spring member mounted internally of said support structure, and extending along the length thereof, at least a portion of which is in registry with said windings; said spring being formed of a material effecting the flux field coupling about said windings, whereby the amount of said material located in registry with said windings effects the inductance thereof; positioning means adjustably expanding and compressing said spring along the length thereof located in registry with said windings; said spring when in expanded condition presenting a minimum amount of said material in registry with said windings to effect a first inductance condition, and when in said compressed condition presenting a maximum amount of material in registry with said windings to effect a second inductance condition; said positioning means selectively positioning said spring between said first and second inductance conditions.

13. A variable inductance element as set forth in claim 12:

wherein said spring material being brass, said first inductance condition corresponding to maximum inductance, and said second inductance condition corresponding to minimum inductance.

References Cited by the Examiner

UNITED STATES PATENTS

| | | | |
|---|---|---|---|
| 2,325,279 | 7/1943 | Schaper | 334—76 |
| 2,925,565 | 2/1960 | Cook et al. | 333—31 |
| 3,019,398 | 1/1962 | Wellman | 333—31 |
| 3,092,793 | 6/1963 | Augustine et al. | 333—31 |

HERMAN KARL SAALBACH, *Primary Examiner.*

A. R. MORGANSTERN, M. NUSSBAUM, *Assistant Examiners.*